United States Patent

[11] 3,633,991

[72] Inventor Morris Miller
 79 Shirley Ave., Revere, Mass. 02151
[21] Appl. No. 862,724
[22] Filed Oct. 1, 1969
[45] Patented Jan. 11, 1972

[54] METALLURGICAL MICROSCOPES WITH MIRROR STAGES
2 Claims, 5 Drawing Figs.

[52] U.S. Cl............................................. 350/91,
 350/86, 350/92
[51] Int. Cl.......................................... G02b 21/06
[50] Field of Search........................... 350/86–89,
 91–95; 356/163

[56] References Cited
UNITED STATES PATENTS
3,512,860 5/1970 Hansen et al. ............... 350/91

FOREIGN PATENTS
45,552 4/1966 East Germany............ 356/163
49,296 7/1966 East Germany............ 350/95

Primary Examiner—David Schonberg
Assistant Examiner—Toby H. Kusmer
Attorney—Abbott Spear ABSTRACT: Metallurgical microscopes are disclosed having mirror stages thus to enable the upper or lower surface of illuminated translucent specimens or translucent portions of specimens to be observed (anterior or posterior) depending on whether the microscope is focused on the specimen or on the reflected image thereof.

PATENTED JAN 11 1972 3,633,991

INVENTOR.
MORRIS MILLER
BY

METALLURGICAL MICROSCOPES WITH MIRROR STAGES

The present invention relates to microscopes of the metallurgical type having mirror stages.

Metallurgical microscopes having illuminators directing light through the objective lens have a wide field of use in examining solid particles. In certain areas of microscopic study, it is desirable to examine both surfaces of a specimen and, at the present time, this can be done only when the specimen can be turned over or when the relative position of its particles is not an important consideration.

The principal objective of the present invention is to make biological studies possible with ease and convenience, an objective attained by providing the microscope with a mirror stage enabling the user, when the specimen is wholly or partially translucent, to focus on either the upper surface thereof or on its reflected image, in either case, only one surface being visible inasmuch as the critical depth of field places the other surface of the specimen out of view.

In the accompanying drawings, there is shown an illustrative embodiment of the invention from which these and other of its objectives, novel features, and advantages will be readily apparent.

Figure 1:
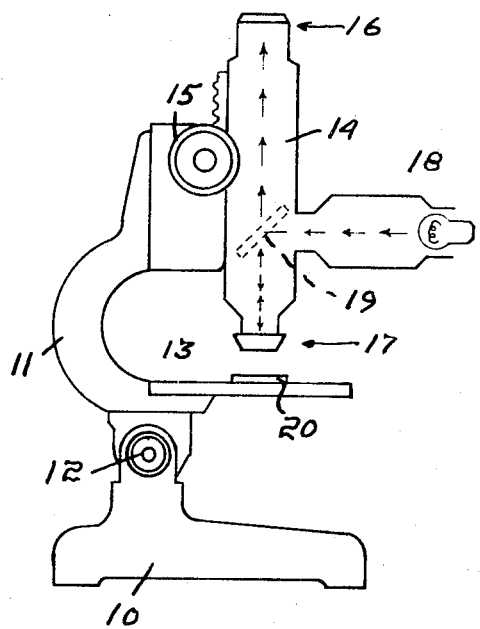
FIG. 1 is a side view of a microscope in accordance with the invention.

The microscope shown in the drawings is of the so-called "-metallurgical" type and has a base 10 to which a mount 11 is pivotally connected as at 12. The mount 11 supports a stage 13 below the microscope body 14, there being a conventional rack and pinion connection between the body 14 and the mount 11, the connection having a knob 15 for use in moving the body 14 towards or away from the stage 13.

The microscope body 14 has a lens system comprising an ocular lens unit generally indicated at 16 and an objective lens unit generally indicated at 17, both units being removable so that different combinations of lenses can be used. An illuminator 18 attached to the microscope body 14 directs a beam of light to a beam splitter 19 disposed to direct light along the light axis through the objective lens of the unit 17.

The microscope, as thus far described is conventional. In accordance with the invention, however, it differs in that its stage 13 includes a mirror 20 desirably but not necessarily set on the stage 13 and removable therefrom so that one mirror may be removed and replaced by one of a different type. Usually a front surface, flat mirror is most satisfactory in use although for special viewing effects, concave or convex mirrors may be used. The area of the mirror 20 is, of course, greater than the field of view of the microscope.

Figure 2:
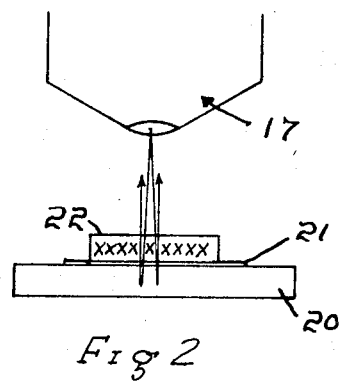
FIG. 2 is a schematic view, on an increase in scale, illustrating the microscope focused on the translucent specimen.
Figure 3:
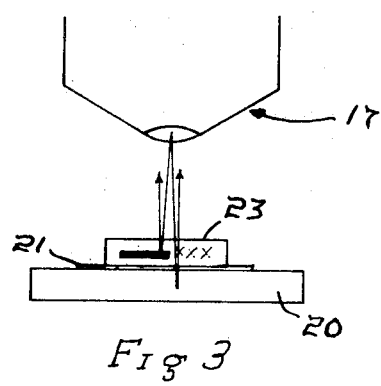
FIG. 3 is a like view but with the specimen partly opaque.
Figure 4:
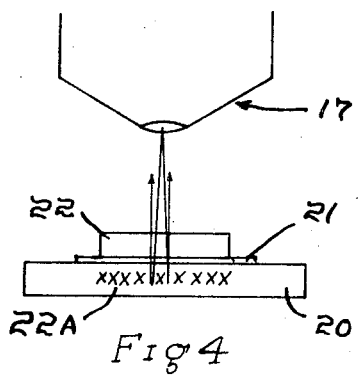
FIG. 4 is a view similar to FIG. 2 but with the microscope focused on the reflected image of the translucent specimen.
Figure 5:
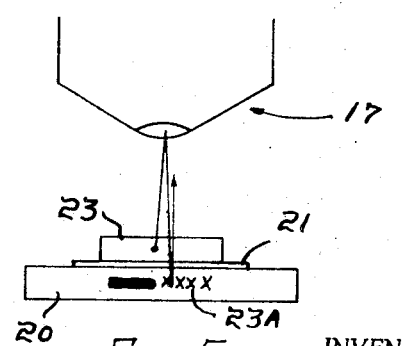
FIG. 5 is a like view but with the specimen partly opaque.

In use, a slide 21 with a biological or translucent specimen 22, FIGS. 2 and 4, or with a specimen 23 that is at least partially opaque, FIGS. 3 and 5, is placed on the stage 13 over the mirror 20 and with the microscope focused, the specimen may be observed with light from the illuminator 18 reflected by the mirror. Because of the high magnification, the depth of field is of course extremely shallow.

These two factors, the depth of field and the reflection of light enable the microscope with its mirror-stage to be used with unique advantages as the lens system may be focused on a specimen or on its reflection in the mirror 20.

By way of example and as illustrated in FIG. 2, the microscope may be focused on the anterior or upper surface of the specimen 22. In this case, the light passes through the specimen 22 and is reflected back by the mirror 20 but the reflected image is not visible because it is beyond the plane on which the microscope is focused.

It is also possible and as illustrated by FIG. 4, to examine the posterior or undersurface of the specimen 22 by focusing the microscope on its reflected image 22A in the mirror 20. In this case, the original is not visible as it is now not in the plane on which the microscope is focused but it is illuminated and the image reflection is that of the undersurface of the specimen. This procedure is especially useful where the specimen is liquid or easily moved or whenever front and back studies are wanted with the relative position of details held constant.

In FIG. 3, the microscope is focused on the upper surface of the specimen 23 with the result that the opaque area is illuminated by front lighting, making it visible to the lens with light reflected from the mirror 20 making the translucent portion equally visible. In FIG. 5, the microscope is focused on the reflected image 23A of the specimen 23. It will be appreciated that while the opaque areas have blocked the passage of light, the results differ from conventional transmitted light systems in that the translucent portions of the specimen are viewed from their posterior or undersurface.

From the foregoing, it will be appreciated that microscopes in accordance with the invention provide the unique advantage of enabling illuminated observation of their upper or lower surfaces at the option of the observer and enabling one microscope to be used in both metallurgical and biological studies.

I claim:

1. A microscope for real or reflected image viewing, said microscope comprising an optical system having ocular and objective lenses defining a sight axis and an illuminator including a beam-splitting prism in the sight axis, a stage including a mirror in the light-sight axis said mirror substantially in direct contact with the underside of a slide having a specimen thereon, and means operable to adjust the relation between the optical system and mirror to enable the system to be focused on either side of said specimen.

2. The microscope of claim 1 in which the mirror is removably supported by the stage.

* * * * *